(12) United States Patent
Wolff et al.

(10) Patent No.: US 10,962,961 B2
(45) Date of Patent: Mar. 30, 2021

(54) SYSTEMS AND METHODS FOR TRACKING CUTTING IMPLEMENTS IN PROCESSING FACILITIES

(71) Applicant: Wolff Industries, Inc., Spartanburg, SC (US)

(72) Inventors: David Wolff, Spartanburg, SC (US); Kalen Caple, Spartanburg, SC (US); John Petty, Spartanburg, SC (US)

(73) Assignee: WOLFF INDUSTRIES, INC., Spartanburg, SC (US)

( * ) Notice: Subject to any disclaimer, the term of this patent is extended or adjusted under 35 U.S.C. 154(b) by 190 days.

(21) Appl. No.: 16/270,065

(22) Filed: Feb. 7, 2019

(65) Prior Publication Data

US 2020/0257271 A1 Aug. 13, 2020

(51) Int. Cl.
*G05B 19/418* (2006.01)

(52) U.S. Cl.
CPC ............ *G05B 19/4183* (2013.01); *G05B 2219/42338* (2013.01)

(58) Field of Classification Search
CPC ............ G05B 19/4183; G05B 2219/42338
See application file for complete search history.

(56) References Cited

U.S. PATENT DOCUMENTS

| | | | | |
|---|---|---|---|---|
| 6,463,352 B1* | 10/2002 | Tadokoro | ............ | G05B 19/4187 |
| | | | | 700/169 |
| 2007/0100486 A1* | 5/2007 | Burda | .................... | G06Q 10/06 |
| | | | | 700/100 |
| 2014/0263633 A1* | 9/2014 | Schmucker | ............ | G16H 40/20 |
| | | | | 235/385 |
| 2015/0097674 A1* | 4/2015 | Mondal | ............. | G08B 13/2462 |
| | | | | 340/572.1 |
| 2019/0088069 A1* | 3/2019 | Erestam | ................. | G06Q 10/06 |
| 2019/0228193 A1* | 7/2019 | Roth | .................. | G06K 7/10297 |

\* cited by examiner

*Primary Examiner* — Thomas C Lee
*Assistant Examiner* — Anzuman Sharmin
(74) *Attorney, Agent, or Firm* — Dority & Manning, P.A.

(57) ABSTRACT

A tracking computing system detects tracking indicia provided on or embedded within cutting implements to be deployed at a processing facility. Periodic implement scans can be performed by one or more mobile computing devices to detect tracking indicia and to determine state data associated with the cutting implements. The state data can be determined at different stages within a processing cycle. The absence of state data for a tracking indicium at one or more stages of the processing cycle may be detected and used to initiate a control action with respect to a potentially missing cutting implement.

18 Claims, 10 Drawing Sheets

FIG. 9

| Serial | Reason | ItemType | TimeStamp |
|---|---|---|---|
| S1 | Contaminated | Knife | 9/5/2018 8:30:03am |
| S2 | Damaged | Knife | 9/5/2018 8:33:05am |
| S3 | Unable to Sharpen | Knife | 9/5/2018 8:35:45am |

Daily Report | Life Cycle Report | Reconciliation Report | Assigned Report | Missing Report | Scrap Report

SYSTEMS AND METHODS FOR TRACKING CUTTING IMPLEMENTS IN PROCESSING FACILITIES

FIELD

The present disclosure relates generally to computer systems and methods for tracking cutting implements, and more particularly to improved tracking of cutting implements within processing facilities.

BACKGROUND

Cutting implements, such as knives, scissors, and sharpeners thereof, are utilized in a wide variety of environments for a wide variety of purposes. In addition to personal use, for example, cutting implements are utilized in various commercial settings. One particular setting is the food processing industry, wherein cutting implements are utilized on a daily basis to process various types of food, such as for example poultry.

In such commercial settings, it is vital to track the cutting implements before, during, and after use. Loss and/or theft of cutting implements can be expensive and detrimental not just due to the loss of the cutting implements themselves, but also due to potential shut-down of the commercial operation in an effort to find the cutting implements. Further, in the food processing industry, processed food can go to waste due to the loss of cutting implements because of the associated shut-down and potential violations of food safety regulations.

Accordingly, improved systems and methods for tracking cutting implements is desired. In particular, simple, efficient, and inexpensive solutions which facilitate such tracking would be advantageous.

BRIEF DESCRIPTION

Aspects and advantages of the disclosed technology will be set forth in part in the following description, or may be obvious from the description, or may be learned through practice of the disclosed embodiments.

In accordance with one embodiment, a trackable cutting implement is provided.

In accordance with another embodiment, a trackable cutting implement is provided.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF FIGURES

A full and enabling disclosure of embodiments, including the best mode thereof, directed to one of ordinary skill in the art, is set forth in the specification, which makes reference to the appended figures, in which:

FIG. 9 illustrates a graphical user interface in accordance with embodiments of the present disclosure.

DETAILED DESCRIPTION

Figure 1:
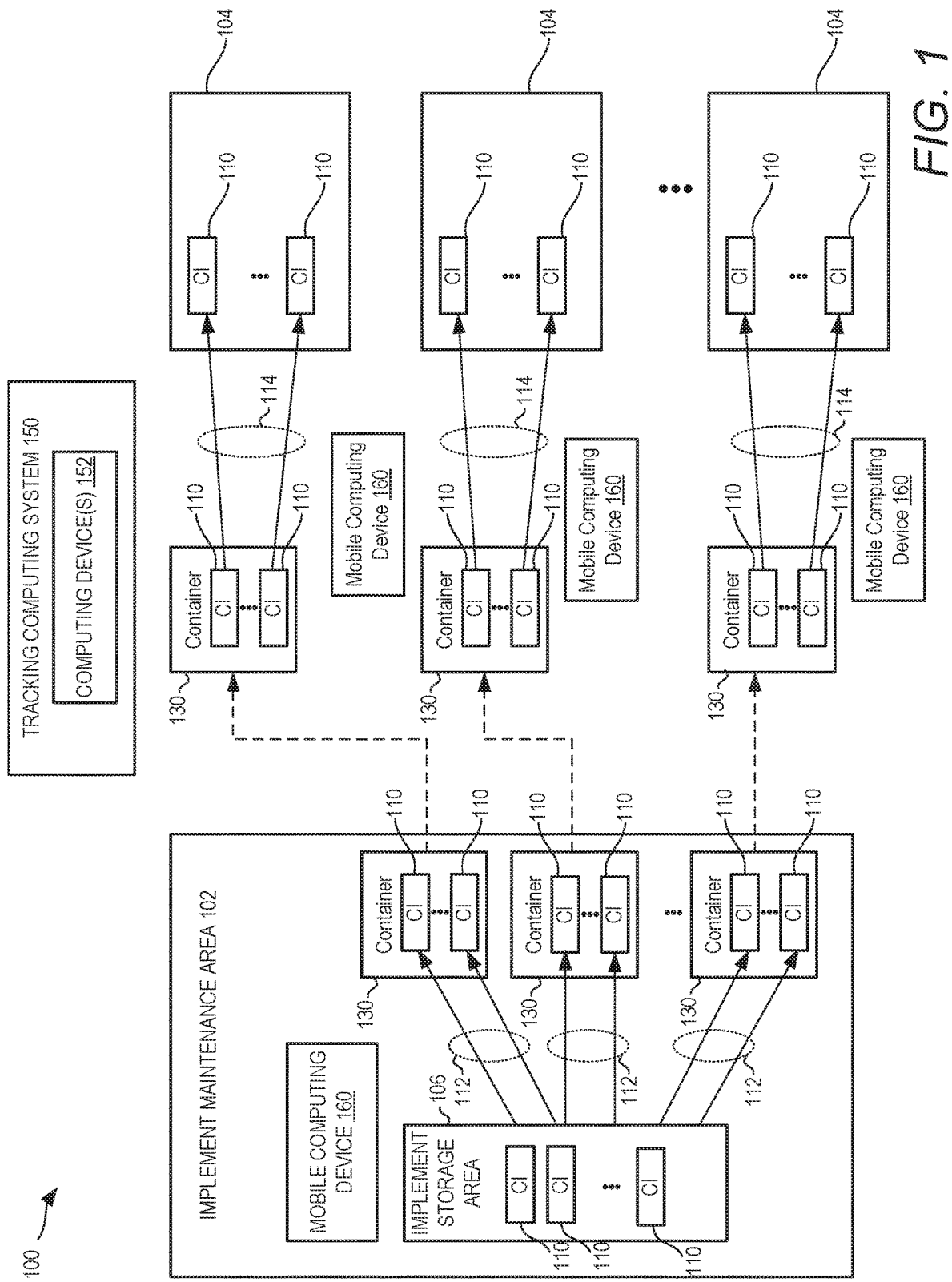
FIG. 1 illustrates an example computing environment in accordance with embodiments of the present disclosure.

Reference now will be made in detail to embodiments of the disclosed technology, one or more examples of which are illustrated in the drawings. Each example is provided by way of explanation of the disclosed embodiments, not limitation of the disclosed technology. In fact, it will be apparent to those skilled in the art that various modifications and variations can be made in the present disclosure without departing from the scope or spirit of the claims. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to computer-based systems and methods for improved object tracking within processing facilities. More particularly, a tracking computing system is provided that can be utilized within processing facilities that deploy a large number of implements (e.g., cutting implements) whose location within the processing facility and assignment to various operators (e.g., human and/or machine operators) and/or transport mechanisms within the processing facility are to be tracked. The tracking computing system can utilize tracking indicia provided on or embedded within the implements to be tracked within the processing facility. Periodic implement scans can be performed by one or more mobile computing devices to detect the tracking indicia, and consequently to determine state data associated with the implements. In this manner, the tracking computing system can provide low-cost tracking of such implements by avoiding the use of costly on-board resources such as electronics or sensors. Accordingly, the tracking computing system can enable practical tracking of objects that may have a limited lifespan within a processing facility, such as cutting implements with one or more cutting edges that are routinely sharpened.

In accordance with example embodiments, each of a plurality of objects (e.g., cutting implement) within a processing facility can include a unique tracking indicium. By way of example, each cutting implement within a processing facility may include a tag comprising a respective tracking indicium. Additionally and/or alternatively, each cutting implement may have a tracking indicium embedded into the handle or blade of the cutting implement (e.g by etching or other means). The tracking indicium of a cutting implement can be detected by scanning the cutting implement using one or more sensors of a computing device, and processing the resulting sensor data to determine the tracking indicium.

The tracking computing system can generate state data that is associated with the tracking indicium of a cutting implement. The state data may include, for example, a status of the respective cutting implement which can be updated as the cutting implement is stored, maintained, transported, and/or utilized within the processing facility. The state data for a cutting implement can be generated and/or updated in response to implement scans of the cutting implement at various stages within a processing cycle.

According to some implementations, the tracking computing system can generate state data for a cutting implement based at least in part on a first implement scan that detects a respective implement identifier of the cutting implement. In some examples, the first state data may include a timestamp and/or location stamp indicating a time, date, and/or location at which the respective implement identifier was detected as part of the first implement scan. By way of example, the cutting implement may undergo a first implement scan prior to transporting the cutting implement from a storage location to a processing line in the processing facility. The first state data can be associated with a stage of the processing cycle. For example, the first state data can be based at least in part on a cycle update indicating that the cutting implement is in a transport stage from the storage location to a processing line.

The tracking computing system can also generate association data to associate the respective tracking indicium of the cutting implement with a respective operator identifier of an operator to which the cutting implement is assigned. For example, the cutting implement may be transported from the storage area to a processing line where it will be utilized. A supervisor may assign the cutting implement to a particular operator. A second implement scan can be performed to detect the respective tracking indicium of the cutting implement. The tracking computing system can associate the respective tracking indicium with a respective operator identifier. In some examples, an additional scan can be performed to determine the operator identifier, such as by scanning a badge or other identifying mechanism of the operator. In other examples, a supervisor or other user may provide input indicating that the cutting implement is assigned to a particular operator. The association data can be associated with a second stage of the processing cycle. For example, the association data can be based at least in part on a cycle update indicating that the cutting implement is in an assignment stage. In some examples, the tracking system can generate additional state data during the assignment stage, such as assignment state data to indicate a time that the cutting implement was assigned to a particular operator.

The tracking computing system can generate additional state data for the cutting implement in response to a third implement scan that detects a respective implement identifier of the cutting implement. In some examples, the additional state data may include state data such as a timestamp and/or location stamp indicating a time, date, and/or location at which the respective implement identifier was detected as part of the third implement scan. By way of example, the cutting implement may undergo a third implement scan prior to or after transporting the cutting implement from the processing line to the storage location. The additional state data can include return state data that is based at least in part on a third stage associated with the processing cycle. For example, the return state data can be based at least in part on a cycle update indicating that the cutting implement is in a return stage from the processing line to the storage location.

The tracking computing system can detect an absence of state data associated with the respective implement identifier of the cutting implement. For example, the tracking computing system can detect the absence of return state data in response to the third cycle update and/or completion of the third implement scan. In response to determining the absence of return state data associated with respective implement identifier, the tracking computing system can determine that the cutting implement is missing or is otherwise unaccounted for. The tracking computing system can determine the respective operator identifier associated with the implement identifier of the cutting implement based on the association data generated in response to the second implement scan. Additionally and/or alternatively, the tracking computing system can determine a respective line identifier associated with the implement identifier indicating a processing line to which the cutting implement was assigned.

The tracking system can initiate a control action associated with the cutting implement in response to determining that the cutting implement is missing. The control action can be based at least in part on the operator identifier associated with the tracking indicium of the cutting implement. By way of example, the control action can include generating or updating a graphical user interface to indicate that the cutting implement is missing. Additionally and/or alternatively, the control action can include transmitting one or more control messages including data indicating that the cutting implement is missing. The graphical user interface or control messages may additionally and/or alternatively include data indicative of one or more processing lines to which the cutting implement was assigned, and/or data indicative of one or more operators to which the cutting implement was assigned. For example, the tracking computing system can transmit one or more messages to a mobile computing device to indicate the information relating to the missing cutting implement.

According to some implementations, the tracking computing system can determine historical use data associated with a cutting implement and/or a type of cutting implement. For example, the tracking computing system can track use of a tool to determine an average number of cycles before the tool is scrapped or otherwise discarded. An average number of time a tool is sharpened before a tool is discarded can also be tracked. In some examples, historical use data can be provided in association with a particular operator identifier. For example an average number of cycles before a particular operator scraps a cutting implement can be determined. Such information can be used to identify reasons for increased wear on cutting implements for example. For example, a technique or other information associated with a particular operator can be identified. In some examples, historical use data can be associated with a type of cutting implement to illustrate an average lifespan or other data associated with the cutting implement.

Embodiments in accordance with the present disclosure provide a number of technical effects and benefits, particularly in the area of computing technology. A tracking computing system in accordance with the disclosed technology can generate state data associated with cutting implements based on detecting tracking indicia. Implement scans can be associated with various stages of a processing cycle. Detections of tracking indicia associated with particular implement scans can be used to determine accurate location data and other information associated with the cutting implement. In this manner, computational waste and other inefficient resource usage associated with computing devices can be avoided. Moreover, onboard electronics and other components are not required for the implements being tracked, thus providing a low-cost solution for implementations where objects such as cutting implements may have limited lifespans.

Additionally, the disclosed technology provides technical effects and benefits with respect to cutting implements and operational use of cutting implements in processing facilities. Proper tracking of cutting implements within a processing facility can be essential to maintaining processing lines in an operational state, as well as to avoid food safety and regulatory failures. For example, a missing cutting implement can lead to the shutdown of an entire processing line as the cutting implement is found before food processing can continue. In some instances, a lost or missing cutting implement can lead to waste of food that is needlessly discarded. A tracking computing system in accordance with example embodiments utilizes detected tracking indicia to provide an effective tracking mechanism within operational facilities. By scanning tracking indicia at various processing stages associated with the processing cycle, accurate tracking can be provided. In this manner, minimal downtime may be experienced as a missing cutting implement can be quickly and accurately located.

With reference now to the figures, example aspects of the present disclosure will be discussed in greater detail. FIG. 1 illustrates an example computing environment 100 in which embodiments of the present disclosure may be practiced for tracking objects such as cutting implements within a processing facility. As depicted, the exemplary processing facility of FIG. 1 generally includes an implement maintenance area 102 and a plurality of processing lines 104. By way of example, the processing facility may be a food processing facility where cutting implements are used on a daily basis to process various types of food, such as for example poultry. Food processing may take place on a plurality of processing lines 104 (e.g., food processing lines) using a plurality of cutting implements (CI) 110. In some examples, the cutting implements may be operated by human operators. In other examples, the cutting implements may be operated by machine operators such as robots or other machines. By way of example, the cutting implements may be used to process poultry such as to divide the poultry into smaller portions and/or to package the smaller portions.

The processing facility includes one or more implement maintenance areas 102. Cutting implements 110 can be stored within the implement storage area 106 when not in use at a processing line 104. In many processing environments, cutting implements 110 are used in processing cycles. For example, a cutting implement 110 may be removed from the implement storage area 106 and transmitted to a processing line 104. The cutting implement may be given to an operator that utilizes the cutting implement on the processing line. At the end of the shift or at another time, the operator or other personnel may return the cutting implement to the storage area.

In many cases, a processing cycle includes sharpening cutting implements at the storage area or another location. Cutting implements may be sharpened between each cycle or at some other interval or time period. Accordingly, the implement maintenance area 102 may include one or more sharpeners for sharpening cutting implements 110 before deployment to processing lines 104. By way of example, a cutting implement may be deployed to a processing line for one cycle (e.g., a shift). At the completion of the cycle, the cutting implement may be returned to the implement maintenance area 102 for sharpening before deployment to a processing line for another cycle.

Generally, containers 130 are utilized to transport cutting implements within the processing facility. For example, a set of cutting implements may be placed into a container 130 at the implement storage area. The container 130 including the set of cutting implements 110 can be transported to a processing line 104. At the processing line 104, the cutting implement can be distributed to a human operator or a machine operator for use during the processing cycle. In some examples, a human operator can transport a container 130 between implement maintenance area 102 and processing line 104. In other examples, vehicles including automated vehicles and robots may be utilized to transport containers between implement storage areas and processing lines.

Tracking computing system 150 enables accurate and low-cost tracking of individual cutting implements within the processing facility. Tracking computing system 150 provides accurate location information associated with a cutting implement as well as assignment information indicating personnel and/or machinery associated with use of the cutting implement. Tracking computing system 150 includes or is in communication with one or more mobile computing devices 160. Although each of mobile computing devices 160 is shown separate from tracking computing system 150 in FIG. 1, it will be appreciated that mobile computing devices 160 may be considered as part of the tracking computing system 150. Tracking computing system 150 may include one or more computing devices 152 in communication with each of the mobile computing devices 160. Tracking computing system 150 can be implemented using one or more computing devices 152, such as one or more servers, client devices, and/or network devices. Various components of tracking computing system 150 may be implemented in hardware, software, or a combination of hardware and software.

Mobile computing devices 160 and tracking computing system 150 may include one or more network interfaces that are used to communicate with other computing devices over a network (not shown). The network interface can include any suitable components for interfacing with one more networks, including for example, transmitters, receivers, ports, controllers, antennas, or other suitable components. The network can be any type of communications network, such as a local area network (e.g. intranet), wide area network (e.g. Internet), cellular network, or some combination thereof. The network can also include a direct connection between a mobile computing device 160 and the tracking computing system 150. In general, communication between the tracking computing system 150 and a mobile computing device 160 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL). It is noted that while references made to mobile computing devices any client or other suitable computing device may be used to perform influence can and other operations as described herein.

Each mobile computing device 160 is configured to detect a tracking indicium on containers 130, cutting implements 110, operator badges, etc., and/or processing lines 104. In other examples, additional tracking indicium may be included at other locations within a processing facility to provide additional tracking granularity. In some examples, a mobile computing device 160 may include a dedicated scanner such as a reflective light reader, a barcode scanner, or other dedicated scanning mechanism configured to generate sensor data associated with scanning of an object such as a cutting implement.

In exemplary embodiments, the tracking indicium is a barcode. Suitable barcode types include, for example, UPC barcodes, EAN barcodes, Code 39 barcodes, Code 128 barcodes, ITF barcodes, Code 93 barcodes, Codabar barcodes, GS1 DataBar barcodes, MSI Plessey barcodes, QR codes, Datamatrix codes, PDF417 codes, and/or Aztec codes. Alternatively, however, the tracking indicia need not be a barcode. For example, suitable alphanumeric coding, color-based coding, symbol-based coding, or other visible indicia may be utilized as the tracking indicia in accordance with the present disclosure.

Trackable cutting implements (and the cutting implements thereof) in accordance with the present disclosure may include cutting tools, such as knives, scissors, food processing hooks (e.g. boning hooks) and other tools which include suitable cutting blades and/or penetrating components. Trackable cutting implements (and the cutting implements thereof) may further include sharpeners and other tools utilized in conjunction with such cutting tools.

The mobile computing device 160 may include a detector configured to detect a tracking indicium from sensor data associated with an object. In other examples, a mobile computing device may include one or more image sensors such as a camera configured to generate sensor data including imagery (e.g., images) of objects such as cutting implements. The mobile computing device may include a detector configured to determine a tracking indicium from imagery captured by the camera. In other examples, a mobile communing device may not include a detector and may instead transmit raw sensor data from the mobile computing device to one or more computing devices of the tracking computing system 150. The mobile computing devices 160 may include one or more network interfaces configured to transmit data to one or more platform computing devices of tracking computing system 150.

Tracking computing system 150 is configured to generate state data and association data for the plurality of cutting implements based on implement scans of the cutting implements and/or cycle updates indicating stages of a processing cycle within the processing facility. For example, state data may be generated for a cutting implement in response to an implement scan performed in association with removing the cutting implement from a storage area or returning the cutting implement from a processing line to the storage area. Association data may be generated for the cutting implement in response to an implement scan performed in association with assigning the cutting implement to an operator.

A specific example of tracking cutting implements between an implement maintenance area 102 and one more processing lines 104 using state data and association data is depicted in FIG. 1. In the disclosed example, cutting implements 110 may be located within implement storage area 106 prior to deployment to one or more processing lines 104. A set of cutting implements 110 may be associated with each container 130 prior to transport to a processing line 104. To facilitate association and tracking of each cutting implement by tracking computing system 150, one or more mobile computing devices 160 may perform a first implement scan 112 for each cutting implement prior to or after being placed into a respective container 130. The first implement scan 112 may initiate a cycle update to the tracking computing system that indicates a deployment stage in some examples. For example, the tracking computing system may detect the cycle update based on receiving data associated with the first implement scan. In some examples, the data may include data indicating the stage of the processing cycle. The mobile computing device 160 and/or tracking computing system 150 may determine a tracking indicium of each cutting implement of the set of cutting implements associated with the container.

Additionally, the mobile computing devices can perform a container scan for the respective container 130. The mobile computing devices 160 can determine a tracking indicium associated with the container 130 and transmit the tracking indicium to tracking computing system 150. Alternatively, the mobile computing device can transmit raw sensor data to tracking computing system 150 which can determine the tracking indicium of the container. Tracking computing system 150 can generate an association between the container tracking indicium and the respective tracking indicium of each cutting implement of the set of cutting implements. For example, tracking computing system 150 can associate the tracking indicium of each cutting implement with a container tracking indicium.

In some examples, the tracking computing system 150 can associate each cutting implement with a transport identifier as part of the deployment stage. For example, the tracking computing system 150 may associate each cutting implement with a user identifier of a supervisor assigned to the set of cutting implements and/or a container. Additionally and/or alternatively, the tracking computing system 150 may associate the container tracking indicium with the user identifier. In some examples, a mobile computing device 160 may be used to scan a badge or other source comprising the user identifier.

Tracking computing system can generate state data for a cutting implement in response to implement scan 112 at the deployment stage. The tracking computing system may receive a first cycle update indicating the first stage of the processing cycle. For example, the tracking computing system may detect the first cycle update in response to the implement scan 112. In accordance with some embodiments, the state data may indicate that the cutting implement has been scanned out or checked out from the implement storage area 106. In some examples, the first state data may include a timestamp including a time that implement scan 112 was performed or the time at which the cutting implement was removed from the storage location. The state data may indicate that the cutting implement has been scanned out or checked out from the implement storage area 106.

After placing each cutting implement into a respective container 130, the container can be transported to a processing line 104. A human operator and/or transport mechanism may be used to transport the container 130 to the processing line 104. At the processing line 104, each cutting implement 110 can be assigned to an operator. An operator may be a human operator or machine operator. In some examples, each cutting implement 110 can be additionally assigned to a particular processing line 104.

A second implement scan 114 of the set of cutting implements assigned to a respective container 130 can be performed prior to deploying each cutting implement to the processing line 104 for use. The second implement scan may initiate a cycle update to the tracking computing system that indicates an assignment stage of the processing cycle. For example, mobile computing device 160 can perform a second implement scan of each cutting implement of the set of cutting implements. The second implement scan may be performed upon removing a cutting implement from the container and prior to deploying the cutting implement at the processing line 104. Each cutting implement can be associated with an operator identifier of a human operator or machine operator to which the cutting implement is assigned.

By way of example, a supervisor may scan a cutting implement using a mobile computing device 160 and provide further input to mobile computing device 160 indicating an assignment of the tracking indicium of the cutting implement to a particular line operator. For instance, the supervisor may scan a badge or other source having a user identifier of the line operator to which the cutting implement is to be assigned to provide additional input. In response, the tracking computing system can associate the tracking indicium of the cutting implement with the user identifier of the line operator. In another example, the supervisor may provide input such as to a keypad or touchscreen to indicate a line operator to which a cutting implement is to be assigned without scanning an operator identifier.

Tracking computing system can generate additional state data for a cutting implement in response to implement scan 114 at the assignment stage. The tracking computing system may receive a second cycle update indicating the second stage of the processing cycle. For example, the tracking computing system may detect the second cycle update in response to the implement scan 114. In accordance with some embodiments, the state data may indicate that the cutting implement has been assigned to a particular operator. The state data may indicate the operator identifier of the particular operator. In some examples, the state data may include a timestamp including a time that implement scan 114 was performed or the time at which the cutting implement was assigned to the operator.

Figure 2:
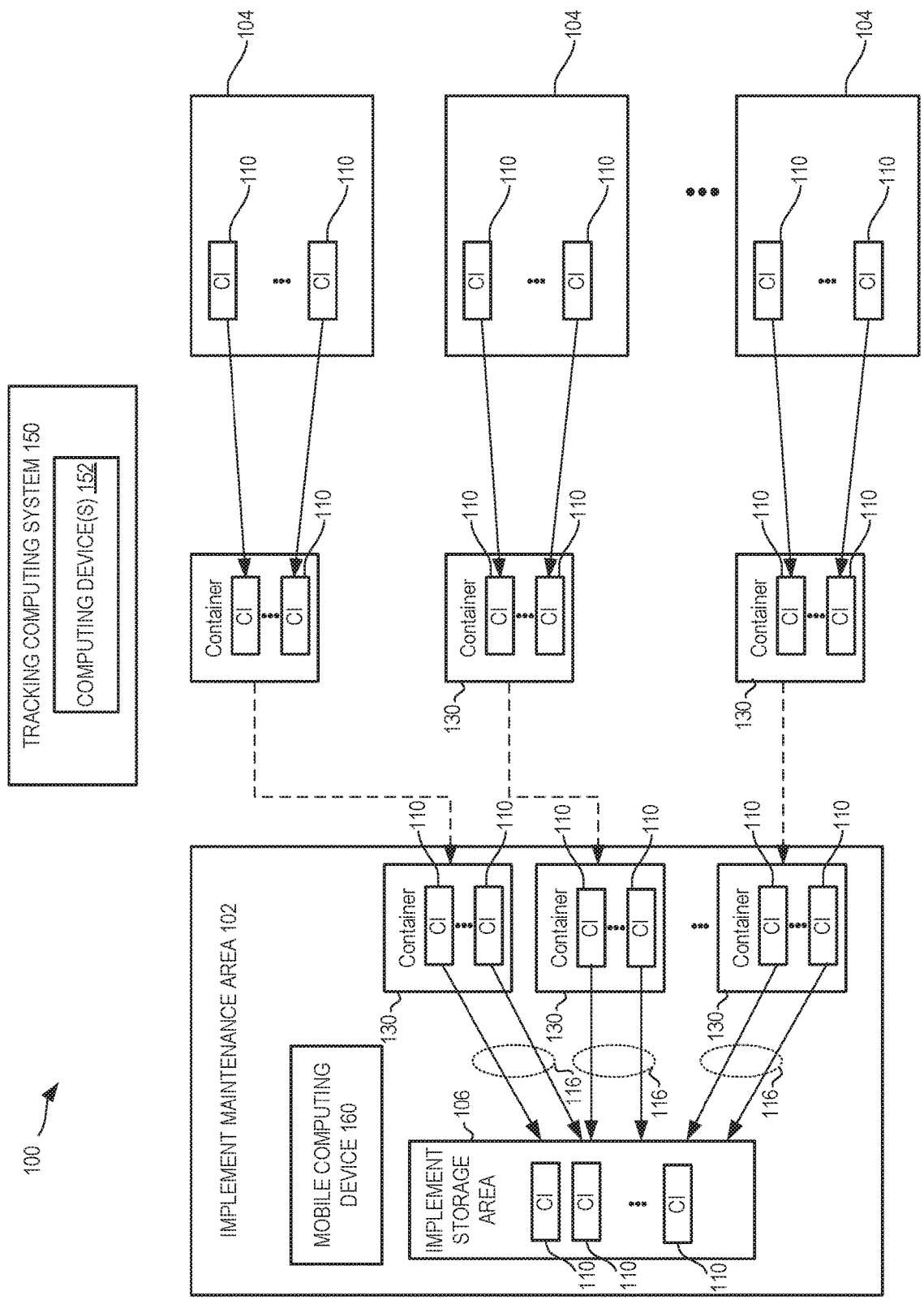
FIG. 2 illustrates an example computing environment in accordance with embodiments of the present disclosure.

FIG. 2 depicts example computing environment 100, illustrating a third processing stage of the processing cycle. As shown in FIG. 2, cutting implements 110 may be returned from processing lines 104 to implement storage area 106. Cutting implements 110 can first be returned to containers 130 which are then transported to the implement maintenance area 102. At implement maintenance area 102, cutting implements 110 are removed from containers 130 and stored within implement storage area 106. In some examples, cutting implements 110 may be removed from containers 130 and sharpened using one or more sharpeners within the implement maintenance area 102.

A third implement scan 116 can be performed upon completion of the processing cycle. In FIG. 2, the third implement scan 116 is performed after removing cutting implements 110 from containers 130 at the implement maintenance area 102. It is noted, however, that the third implement scan can be performed prior to or after transporting container 130 including the set of cutting implements 110 to the implement maintenance area 102. Additionally, in some examples a third implement scan can be performed when placing the cutting implements into containers 130 and a fourth implement scan can be performed when removing cutting implements 110 from the containers at the implement maintenance area. The third implement scan may include scanning each cutting implement in the container 130 to detect the tracking indicium of each cutting implement within the container 130. Additionally, the mobile computing devices can perform a container scan for the respective container 130 and determine a tracking indicium associated with the container 130.

Tracking computing system 150 can generate additional state data for a cutting implement in response to implement scan 116 at the return stage. The tracking computing system may receive a third cycle update indicating the third stage of the processing cycle. For example, the tracking computing system may detect the third cycle update in response to the implement scan 116. In accordance with some embodiments, the state data may indicate that the cutting implement has been returned to the implement storage area 106. In some examples, the state data may include a timestamp including a time that implement scan 116 was performed or the time the cutting implement was returned to the storage location. The state data can indicate that the cutting implement has been scanned in or checked in from the implement storage area 106.

In some examples, the state data of the first, second, and/or third implement scans can be used by the tracking computing system to determine a status associated with each tracking indicium. For example, the tracking computing system can determine whether each tracking indicium associated with a particular container 130 was detected as part of the third implement scan. The tracking computing system can access the association data for a particular container 130 and determine whether each tracking indicium associated with the container tracking indicium has been detected as part of the third implement scan. In some examples, the tracking computing system can compare the state data from the first implement scan with state data from another scan to determine a status. For example, the tracking computing system can determine the presence of state data indicating a scan or check out from implement storage area for a particular tracking indicium during a first implement scan. The tracking computing system can determine the absence of state data indicating a scan or check-in to the implement storage area during a subsequent third scan. In response to determining the absence of state data associated with the subsequent implement scan, the tracking computing system can generate a missing status identifier for the particular tracking indicium. The tracking computing system may generate data indicative of the missing cutting implement. By way of example, the tracking computing system can generate an alert such as a message indicating that a tracking indicium was not found as a result of the third implement scan.

Figure 3:
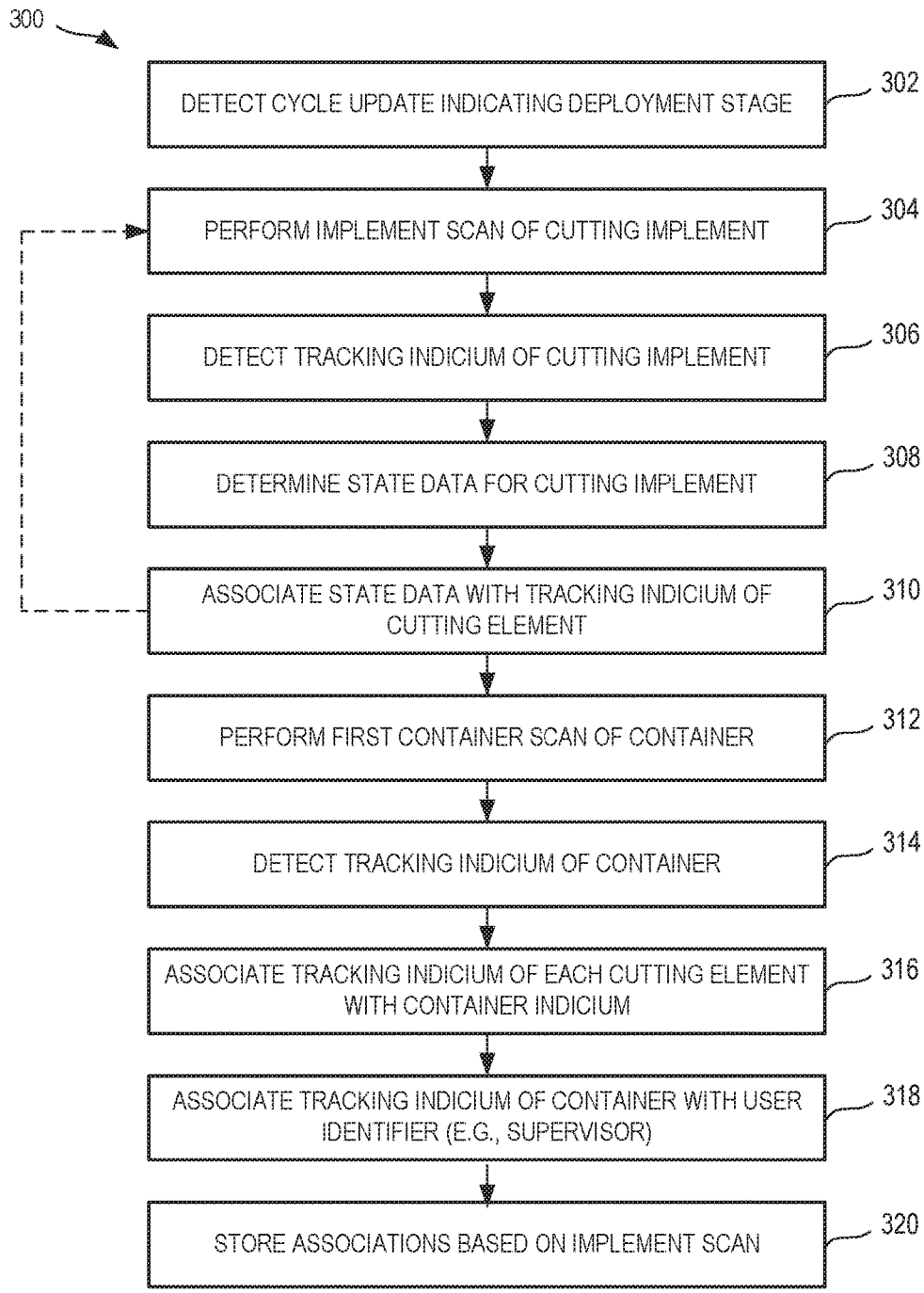
FIG. 3 illustrates a block diagram of an example method of generating state data based on detecting a tracking indicium in accordance with embodiments of the present disclosure.

FIG. 3 is a flowchart depicting an example method 300 of performing an implement scan at a first processing stage to generate state data for a plurality of cutting implements to be deployed in association with a processing facility. One or more portions of method 300 can be implemented by one or more computing devices such as, for example, a computing device 152 of tracking computing system 150, a mobile computing device 160 as depicted in FIG. 1 or computing system 600 depicted in FIG. 10. One or more portions of the method 300 described herein can be implemented as an algorithm on the hardware components of the devices described herein (e.g., as in FIG. 1 or FIG. 10) to, for example, to detect tracking indicia using implement scans and to generate state data for a physical object. Although FIG. 3 depicts steps performed in a particular order for purposes of illustration and discussion, method 300 of FIG. 3 and the other methods (e.g., methods 350 and 400) described herein are not limited to the particularly illustrated order or arrangement. The various steps of the methods disclosed herein can be omitted, rearranged, combined, and/or adapted in various ways without deviating from the scope of the present disclosure.

At (302), a cycle update indicating a deployment stage of a processing cycle at a processing facility is detected. For example, tracking computing system 150 may receive an indication of a processing cycle update from a mobile computing device 160. As described below, a processing cycle update can be detected in response to receiving data indicative of an implement scan. For example, data indicative of an implement scan can include an indication of a corresponding stage of the processing cycle.

At (304), an implement scan of a cutting implement to be deployed in association with the processing facility is performed. For example, one or more mobile computing devices 160 may initiate and perform an implement scan. In some examples, a user such as a supervisor of one or more portions of a processing cycle may provide input to mobile computing device indicative of the processing stage associated with the implement scan.

At (306), a tracking indicium of the cutting implement can be detected. For example, a mobile computing device can utilize one or more sensors to detect a visual tracking indicium on or embedded within the cutting implement. The mobile computing device may include one or more sensors such as a light detection sensor, laser sensor, image sensor (e.g., camera), or other sensor configured to detect a tracking condition. Mobile computing device 160 may receive sensor data from the one or more sensors from which the tracking indicium is detected. In other examples, the one or more mobile computing devices may transmit sensor data to a computing device of the tracking computing system. The tracking computing system can detect a tracking indicium from sensor data received from the mobile computing device.

At (308), state data is determined for the cutting implement. The state data can be associated with the processing stage of the processing cycle in some examples. According to some implementations, the state data may include data indicative of a time associated with the implement scan and/or processing stage, a location (e.g., global positioning satellite coordinate, etc.) of the implement scan, a status of the cutting implement (scanned out or checked out, scanned in checked in, missing, etc.), or other information associated with the cutting implement. In some examples, the tracking computing system determines the state data based on the tracking indicium and/or cycle update associated with the implement scan.

At (310), the state data is associated with the tracking indicium of the cutting implement. For example, the tracking computing system may update a data store (e.g., one or more databases) with information that associates the state data with the tracking indicium of the cutting implement. The operations at (304) through (310) can be repeated to detect the tracking indicium and state data for additional cutting implements.

At (312), a container scan can be performed for the container associated with the cutting implement. At (314), a tracking indicium of the container can be detected. For example, the one or more mobile computing device may be used to generate sensor data associated with scanning a tracking indicium on or embedded within the cutting implement (e.g., on a tag). It is noted that scanning and detecting the tracking indicium of the container at (312) and (314) can be performed prior to implement scan at (304).

At (316), the tracking indicium of each cutting implement is associated with the tracking indicium of the corresponding container. For example, tracking computing system 150 may update a data store to associate the tracking indicium of the container with the tracking indicium of each of the cutting implements.

A user may provide input to indicate that a container scan is associated with an implement scan. In some examples, the mobile computing device may provide a graphical user interface enabling a user to indicate a processing stage and to associate one or more implement scans with a container scan. For example, a user may provide input indicating that one or more cutting implements are being checked out from the storage area such that subsequent implement scans are associated with the container scan. In other examples, the mobile computing device may be configured to automatically detect a processing stage and associate a container scan with an implement scan. For example, the computing device may associate a tracking indicium of a cutting implement from an implement scan with a tracking indicium of a container detected in response to the container scan being performed immediately before or after the implement scan.

At (318), the tracking indicium of the container is optionally associated with a user identifier. For example, the tracking addition of the container can be associated with a supervisor or other personnel associated with deployment of the container associated cutting implements. In some examples, the tracking indicium of each cutting implement can be associated with a user identifier.

At (320), the associations from (316) and/or (318) can be stored based on the implement scan. The tracking computing system can update a data store such as one or more databases with data indicative of an association between the tracking indicium of a container and the tracking indicium of the corresponding cutting implements. Optionally, the tracking computing system can update the one or more data stores with data indicative of associations between the tracking indicia of the cutting implements and a user identifier and/or an identifier of a vehicle or other transport mechanism.

Figure 4:
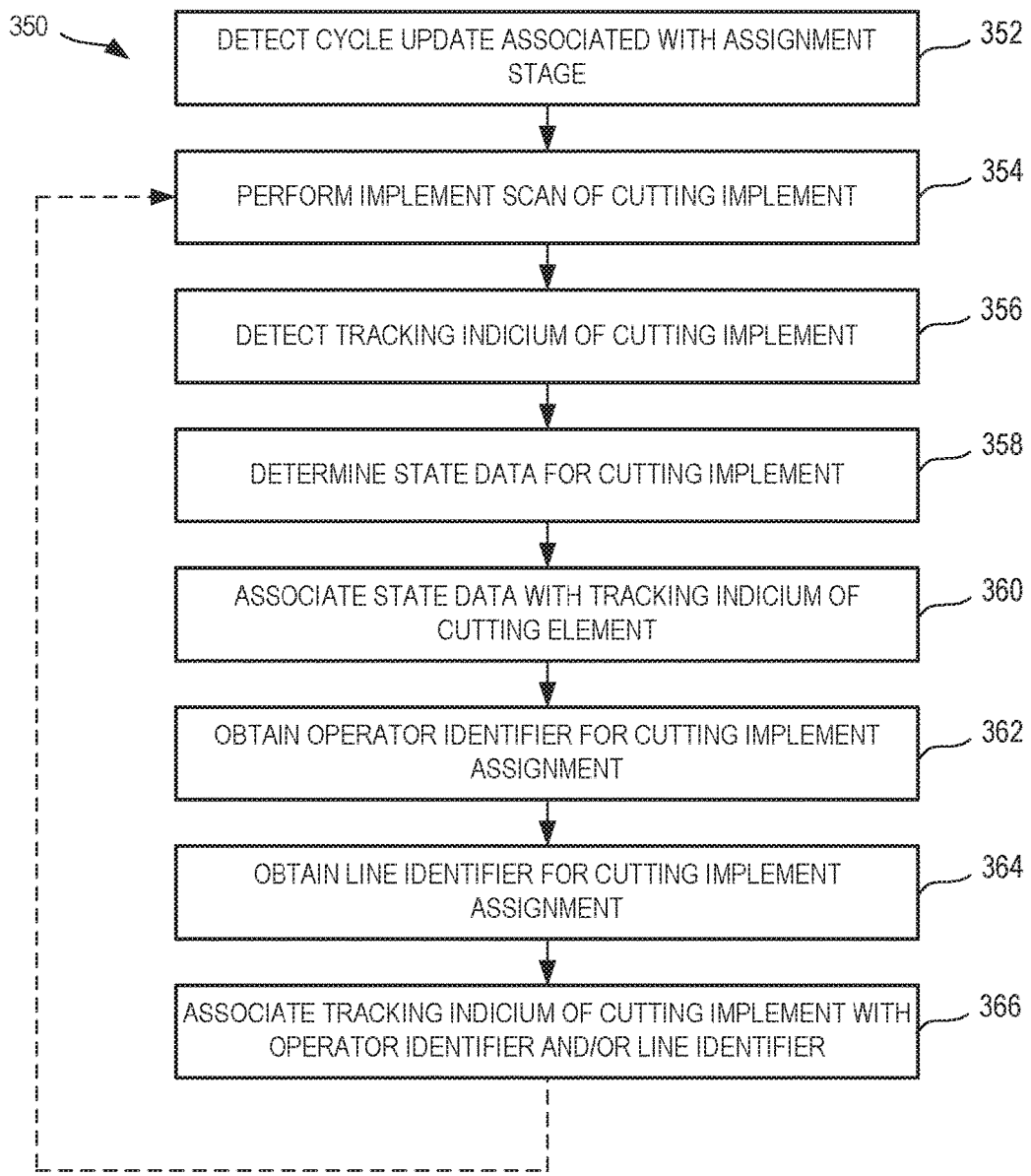
FIG. 4 illustrates a block diagram of an example method of generating association data based on detecting a tracking indicium in accordance with embodiments of the present disclosure.

FIG. 4 is a flowchart depicting an example method 350 of performing an implement scan at a processing stage of a processing cycle to generate association data for a cutting implement to be deployed in association with a processing facility. One or more portions of method 350 can be implemented by one or more computing devices such as, for example, a computing device 152 of tracking computing system 150, a mobile computing device 160 as depicted in FIG. 1, and a computing system 600 depicted in FIG. 10. One or more portions of the method 350 described herein can be implemented as an algorithm on the hardware components of the devices described herein (e.g., as in FIG. 1) to, for example, detect tracking indicia using implement scans and to generate association data for a physical object.

At (352), a cycle update associated with an assignment stage of a processing cycle at a processing facility including one or more processing lines is detected. For example, tracking computing system 150 can receive an indication from a mobile computing device of a processing cycle update. As described below, a processing cycle update can be detected in response to receiving data indicative of an implement scan. Data indicative of the implement scan can provide an indication of a corresponding stage of the processing cycle. At (354), an implement scan can be performed and at (356), a tracking indicium of the cutting implement can be detected.

At (358), additional state data can optionally be determined for the cutting implement in association with the assignment stage of the processing cycle. The state data may include data indicative of a time associated with the implement scan and/or processing stage, a location of the implement scan, a status of the cutting implement, or other information associated with the cutting implement. In some examples, the tracking computing system determines the state data based on the tracking indicium and/or cycle update associated with the implement scan. At (360), the additional state data is associated with the tracking indicia of the cutting implement.

At (362), an operator identifier is obtained for assignment of the cutting implement. In some examples, a mobile computing device may provide an interface through which a user such as a supervisor may provide input to identify a user identifier (e.g., using a keyboard, touchscreen, voice input, etc.). In other examples, the mobile computing device may be used to detect a user identifier, such as by scanning a badge or other source including the user identifier.

At (364), a line identifier is obtained for the assignment of the cutting implement. It is noted that (364) is optional. A line identifier can be obtained in a similar manner to an operator identifier, such as by input through a user interface and/or through scanning a line identifier. For example, a line identifier may be embedded in or attached to one or more machines associated with a processing line.

At (366), the tracking indicium of the cutting implement can be associated with the operator identifier of the operator to which the cutting implement is assigned and/or the line identifier of the processing line to which the cutting implement is assigned. For example, tracking computing system 150 may update a data store with data to associate the tracking indicia of the cutting implement and the user identifier and/or line identifier. For example, one or more tables may be maintained in memory having an entry for the tracking indicia of a cutting implement, the tracking indicia for the cutting implement may be associated in the table with one or more additional entries. For example, the one or more additional entries may include the line identifier and user identifier of the cutting tool assignment. The operations at (354) through (366) can be repeated to associate the tracking indicium with an operator identifier and/or line identifier.

Figure 5:
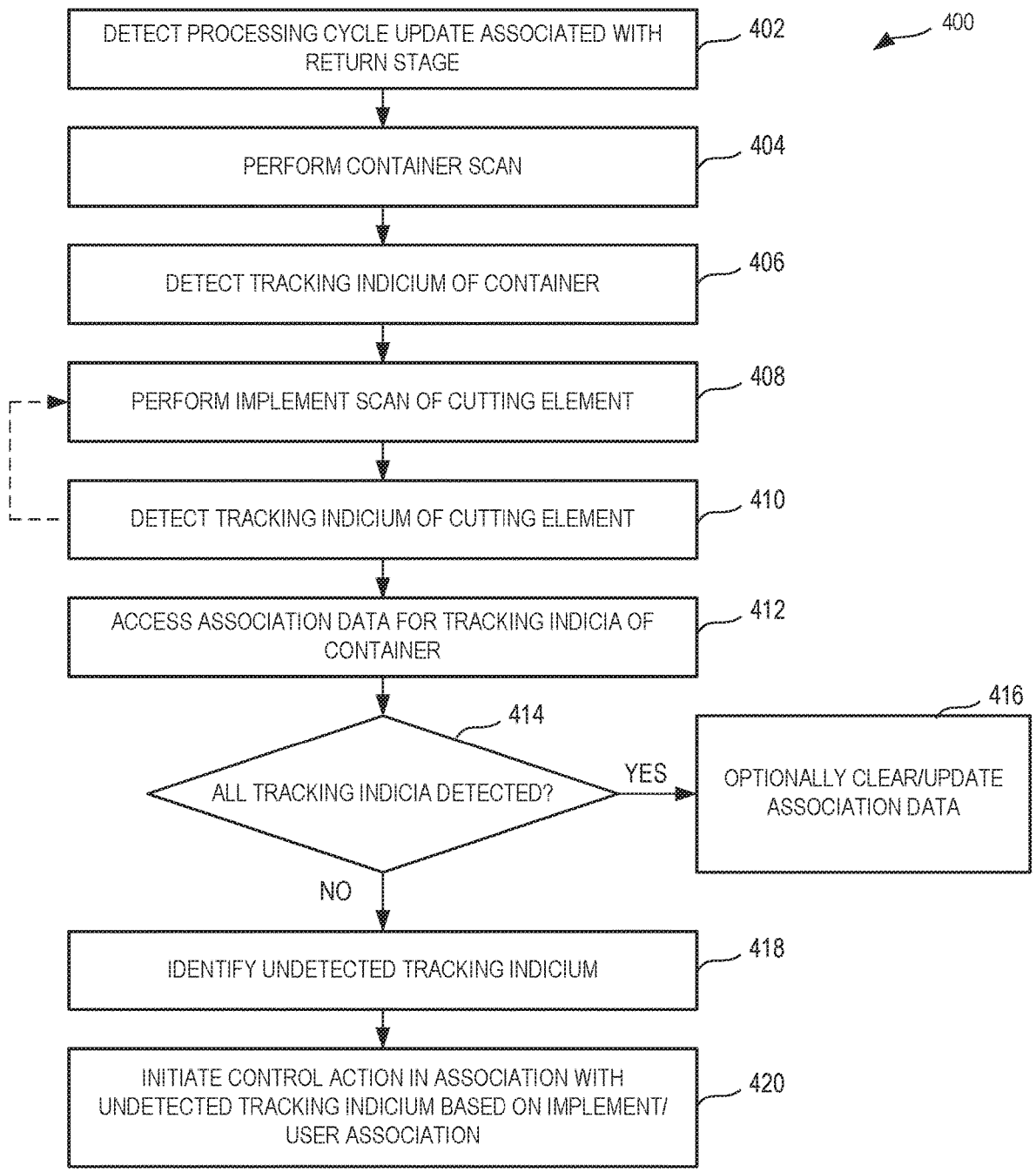
FIG. 5 illustrates a block diagram of an example method of detecting a missing cutting implement based at least in part on the absence of state data associated with an implement in accordance with embodiments of the present disclosure.
Figure 6:
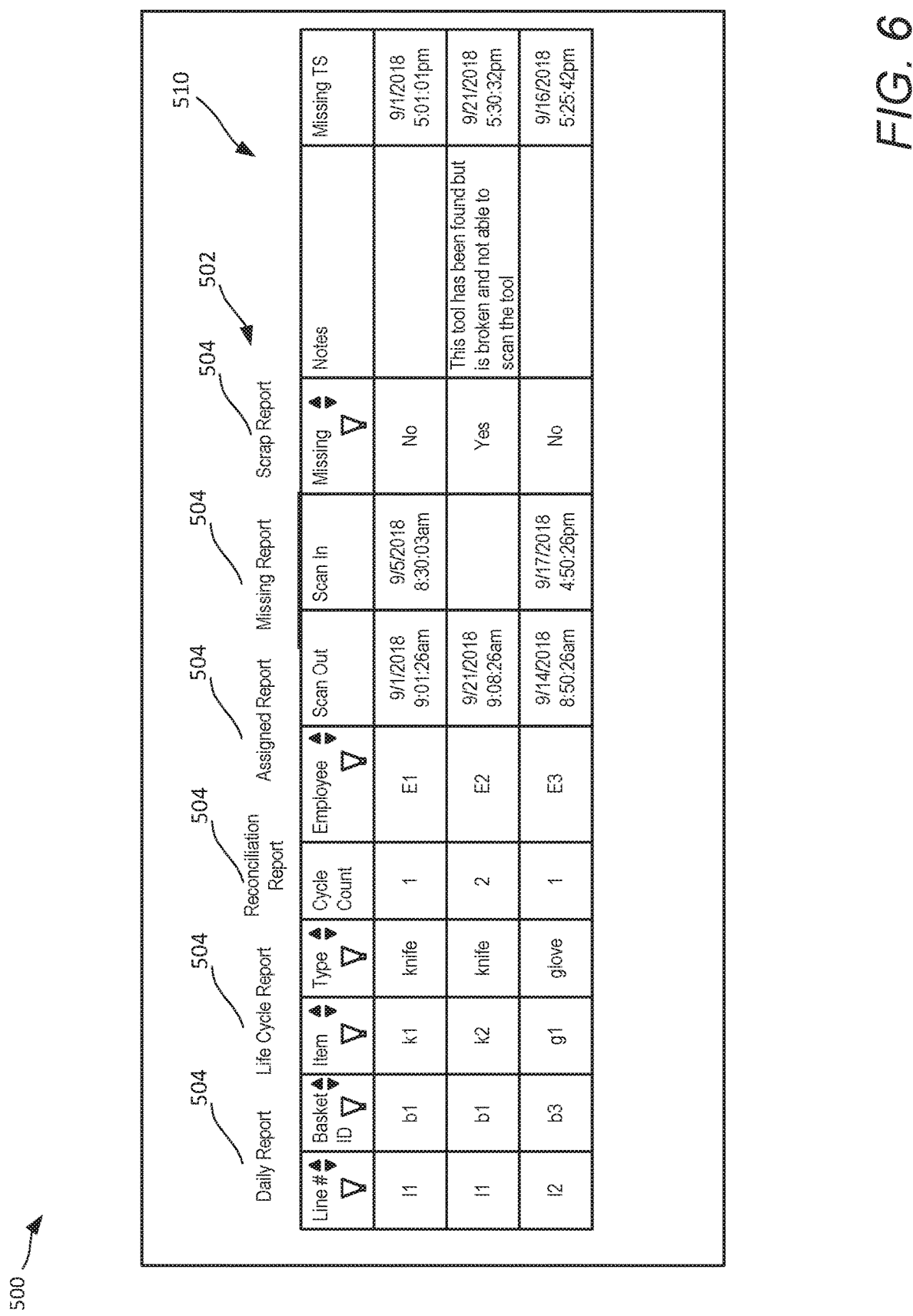
FIG. 6 illustrates a graphical user interface in accordance with embodiments of the present disclosure.

FIG. 5 is a flowchart depicting an example method 400 of performing an implement scan at a return stage of a processing cycle to generate state data and detect potentially missing cutting implements. One or more portions of method 400 can be implemented by one or more computing devices such as, for example, a computing device 152 of tracking computing system 150, a mobile computing device 160 as depicted in FIG. 1, or a computing device 600 as depicted in FIG. 6 One or more portions of the method 400 described herein can be implemented as an algorithm on the hardware components of the devices described herein (e.g., as in FIG. 1) to, for example, detect tracking indicia using implement scans, generate state data for cutting implements, and detect a missing cutting implement based on an absence of state data.

At (402), a processing cycle update associated with a return stage of a processing cycle is detected. For example, tracking computing system 150 may receive an indication from a mobile computing device of a processing cycle update. As described below, a processing cycle update can be detected in response to receiving data indicative of an implement scan. Data indicative of the implement scan can provide an indication of a corresponding stage of the processing cycle.

At (404), a container scan can be performed for a container and at (406), a tracking indicium of the container can be detected. At (408), an implement scan can be performed and at (410), a tracking indicium of the cutting implement can be detected. It is noted that scanning and detecting the tracking indicium of the cutting implement at (408) and (410) can be performed prior to container scan at (404). The operations at (408) through (410) can be repeated to scan additional cutting implements.

At (412), the association data for the tracking indicia of the container can be accessed. At (414), it can be determined whether the tracking indicia for all cutting implements associated with the tracking indicium of the container have been detected. If each implement tracking indicium associated with the container tracking indicium is detected, method 400 continues at (416). At (416), the associations between the tracking indicia of the cutting implements and the tracking indicium of the container can be cleared. For example, the tracking computing system can delete the association data. Additionally and/or alternatively, associations with operator identifiers or line identifiers can also be cleared. It is noted that (416) is optional.

If any tracking indicium for a cutting implement associated with the container identifier is not detected, method 400 continues at (418). At (418), one or more undetected tracking indicia are identified. For example, the tracking computing system can compare the tracking indicium of the container with the tracking indicia determined from the implement scan during the return stage. Any tracking indicium included in the association data but not indicated in the implement scan can be determined to be an undetected tracking indicium. The tracking computing system can determine that the cutting implement associated with the tracking indicium is missing or is otherwise unaccounted for.

At (420), a control action can be initiated in response to the undetected tracking indicium. The control action can be based on association data including implement/operator associations and/or implement/line associations. For example, the tracking computing system can identify an operator identifier associated with the tracking indicia of the missing cutting implement. Additionally and/or alternatively, the tracking computing system can identify a line identifier associated with the tracking indicium. Tracking computing system 150 can utilize the operator identifier and/or the line identifier to determine a location or a probable location of the missing cutting implement. For example, the tracking computing system can update a user interface or generate one or more control messages indicating the operator identifier and/or the line identifier. Additionally and/or alternatively, the tracking computing system can provide information associated with the operator identifier and/or the line identifier, such as a location of the operator and/or location of the processing line or a machine associated therewith.

According to some implementations, tracking computing system 150 can provide one or more user interfaces such as graphical user interfaces to facilitate providing information relevant to implement tracking within the processing facility. In some examples, the tracking computing system can generate one or more missing implement report interfaces. FIG. 6 illustrates an example of a missing implement report interface in accordance with example embodiments of the disclosed technology. A missing implement report interface can be generated to identify a missing cutting implement detected in response to an implement scan.

The example report interface depicted in FIG. 6 is provided as part of a graphical user interface 500. Graphical user interface 500 includes a selection bar 502 which may be selected by a user to display information associated with each selection tab 504. As depicted in FIG. 6, a missing report selection tab 504 has been selected. In response, tracking computing system 150 updates graphical user interface 500 to provide a missing cutting implement report interface 510. Missing cutting implement report interface 510 includes a plurality of columns, such as for example: a line number column, a basket ID column, an item number column, an item type column, a cycle count column, an employee identifier column, a scan out column, a scan in column, a missing (e.g., status) column, a notes column, and a timestamp column. It is noted that the columns shown are provided by way of example only. A graphical user interface in accordance with example embodiments may include additional or fewer columns and those presented. Moreover, tracking information associated with the tracking computing system may be presented or otherwise provided in different manners.

For each row, fields corresponding to the columns are populated based on a corresponding item number. The field for the item number column can include the tracking indicium of the respective cutting implement. The line number field can be populated with a line number for the processing line to which the cutting implemented is assigned. The line number may be determined as part of an implement scan during an assignment stage. Similarly, the employee field can be populated with an operator identifier determined as part of an implement scan during the assignment stage. The basket ID field may contain the tracking indicium of a container associated with the cutting implement. The tracking indicia can be determined as part of an implement scan performed during a deployment stage. The type field can be populated with predetermined information including an item type associated with a particular item number or tracking indicia.

The scan out field can be populated with state data associated with a deployment stage in some examples. For example the state data can be associated with removal of the cutting implement from a storage area. In this example, the state data includes a timestamp indicating a time and date at which the corresponding cutting implement was scanned out of the implement storage area. The scan in field can be populated with state data associated with a return stage of the processing cycle in some examples. For example, the state data can be associated with returning the cutting implement from a processing line to the storage area. In this example, the state data includes a timestamp indicating a time and date at which the corresponding cutting implement was scanned into the implement storage area. It is noted that state data associated with a deployment stage and/or return stage may include additional data to that shown.

The cycle count field can be populated with cycle count data indicating a number of processing cycles that a respective cutting opponent has undergone. For example, the cycle count data may be determined based on an implement scan associated with checking an item out of the storage area and an implement scan associated with checking an item back into the storage area. Other techniques may be used to determine the cycle count utilizing scanning technology.

The missing column field can be populated with state data including a status indicating whether a cutting implement is missing or otherwise unaccounted for. In some examples, a cutting implement can be identified as missing if the corresponding tracking indicium does not include state data for a return stage. In some examples, the tracking computing system may determine that an item is missing if it includes state data associated with a deployment stage but not with a return stage, such as by including state data for the scan out field but not including state data for the scan in field. In some examples, the missing status is determined after a predetermined amount of time after a scan out if a scan in is not performed. In other examples, the missing item status may be determined in response to a particular processing stage completing and corresponding scan in data not being received. For example, the tracking indicium of a container may be detected by a container scan during the return stage of a processing cycle. Association data for the tracking indicium of the container can be accessed to determine the tracking indicia of one or more cutting implements associated with the container. The tracking computing system can determine that a cutting implement associated with the container is missing if the respective tracking indicium is not detected during a return stage implement scan. The notes field allows a user to provide information associated with an item, such as information relating to a missing item, a found item, and/or a damaged item. The timestamp field indicates a time and date associated with when a cutting implement was determined to be missing.

In some examples, a missing implement report may indicate cutting implements that are missing as well as cutting implements that are not missing. In such cases, the missing implement report may indicate a status of each implement indicating whether the implement is missing or not.

Figure 7:
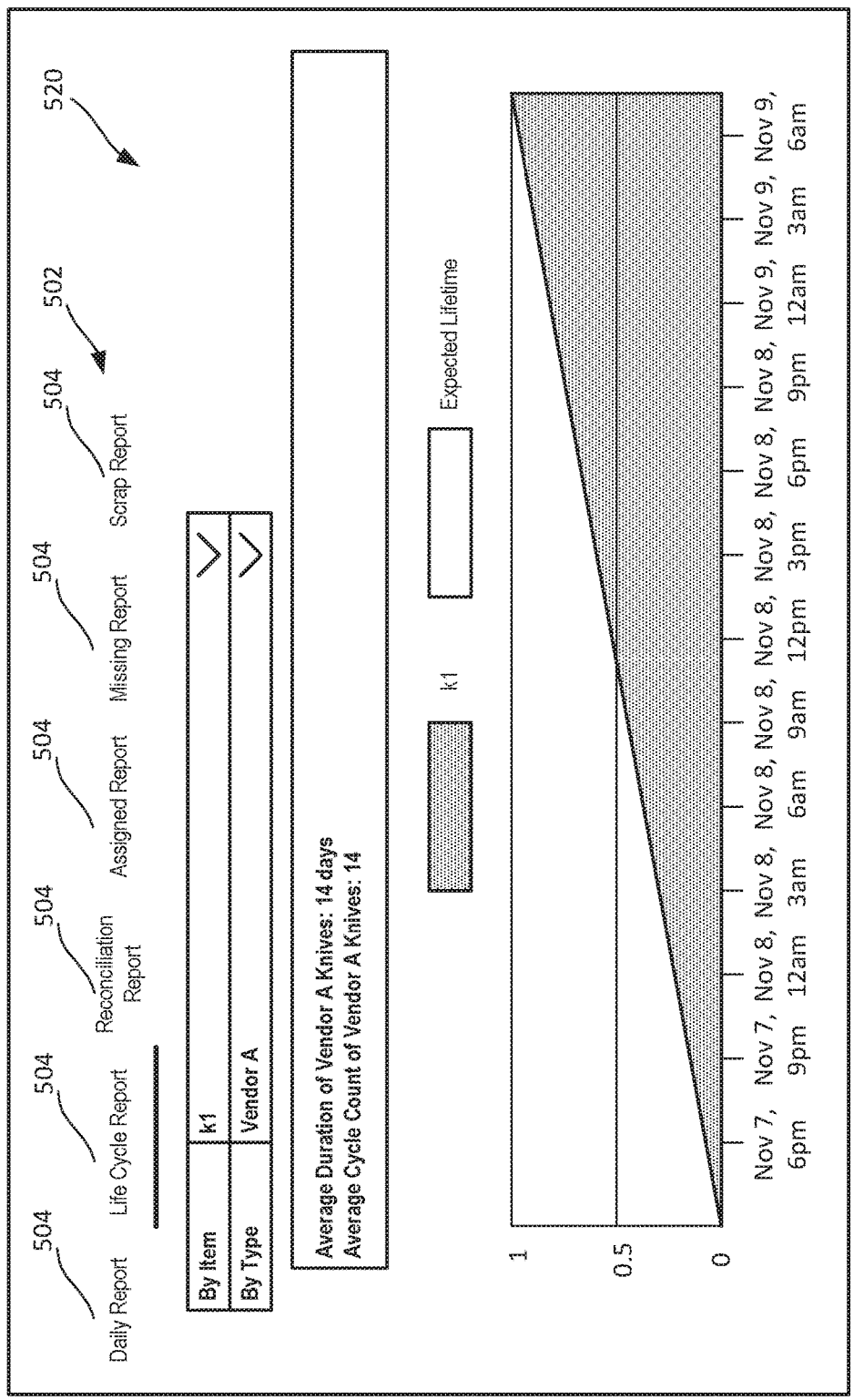
FIG. 7 illustrates a graphical user interface in accordance with embodiments of the present disclosure.

According to some implementations, the tracking computing system can provide a lifecycle report interface. FIG. 7 illustrates an example of a lifecycle report interface in accordance with example embodiments of the disclosed technology. A lifecycle report interface 520 can be generated to identify an actual, average, and/or projected lifecycle for a cutting implement or type of cutting implement. The example report depicted in FIG. 7 can be provided as part of graphical user interface 500. As depicted in FIG. 7, a selection tab 504 for a lifecycle report interface has been selected. In response, tracking computing system 150 updates graphical user interface 500 to provide a lifecycle report interface 520.

A lifecycle report interface can be provided for a particular cutting implement or a particular type of cutting implement. The lifecycle interface can indicate an average duration of use of the cutting implement prior to having to be scrapped or otherwise replaced. The lifecycle interface can include an average cycle count associated with the cutting implement. The cycle count may include a number of processing cycles prior to the cutting implement being scrapped or otherwise replaced.

Figure 8:
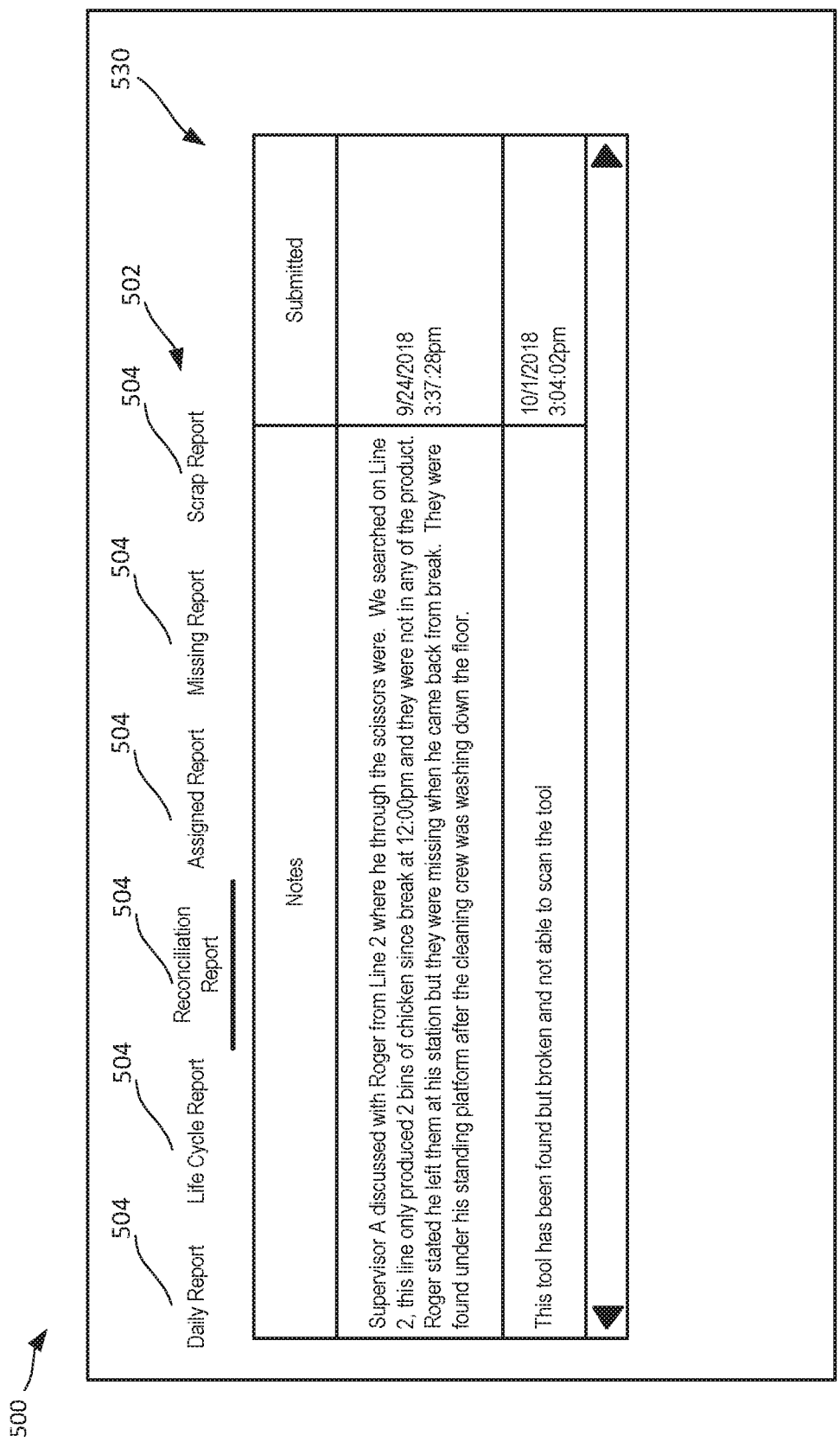
FIG. 8 illustrates a graphical user interface in accordance with embodiments of the present disclosure.

According to some implementations, the tracking computing system can provide a reconciliation report interface. FIG. 8 illustrates an example of a reconciliation report interface in accordance with example embodiments of the disclosed technology. A reconciliation report interface can be generated to identify and/or receive information relating to a cutting implement. The example reconciliation report interface depicted in FIG. 8 can be provided as part of graphical user interface 500. As depicted in FIG. 8, a selection tab 504 for a reconciliation report interface has been selected. In response, tracking computing system 150 updates graphical user interface 500 to provide a reconciliation report interface 530.

A reconciliation report interface can include a notes field and a time field indicating when the note was submitted. A reconciliation report interface can be generated for a missing cutting implement in some examples. One or more notes fields may be completed by a user to indicate information relating to a missing cutting implement. Additional notes fields may be provided to indicate information relating to finding or scrapping a cutting implement for example.

According to some implementations, the tracking computing system can generate a scrap report. FIG. 9 illustrates an example of a scrap report interface in accordance with example embodiments of the disclosed technology. A scrap report interface 540 can be generated to identify and/or receive information relating to scrapping a cutting implement. Scrapping a cutting implement may refer to discarding or otherwise indicating that the cutting implement is no longer suitable for use within the processing facility. The example scrap report interface depicted in FIG. 9 can be provided as part of a graphical user interface 500. As depicted in FIG. 9, a selection tab 504 for a scrap report interface has been selected. In response, tracking computing system 150 updates graphical user interface 500 to provide a scrap report interface 540.

A scrap report interface may indicate the tracking indicium of a cutting implement and a reason field indicating a reason as to why the cutting implement was scrapped or is to be scrapped. An item type field may be provided to indicate the type of item of the cutting implement. The report may additionally include a timestamp field indicating a time at which the cutting implement was scrapped.

Figure 10:
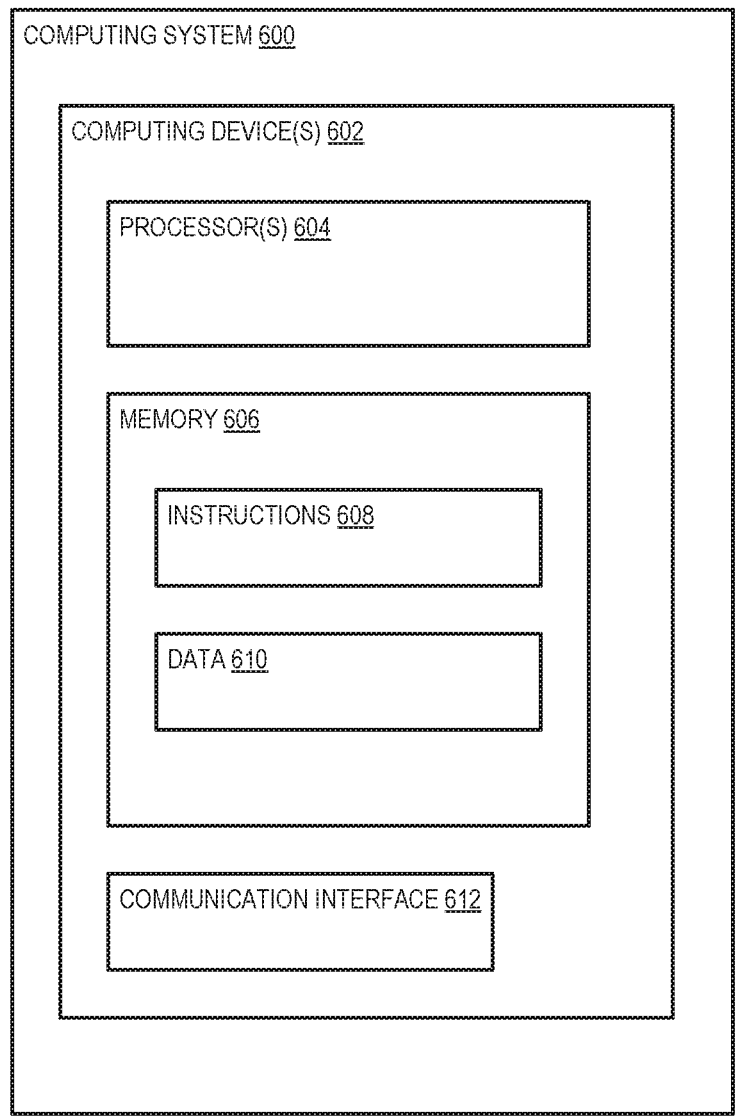
FIG. 10 illustrates a block diagram of an example of a computing system in accordance with embodiments of the present disclosure.

FIG. 10 depicts a block diagram of an example computing system 600 that can be used by a tracking control system, mobile computing device, or other systems to implement methods and systems according to example embodiments of the present disclosure. As shown, the computing system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for generating performing implement and other scans to determine tracking indicia in accordance with processing stages of processing cycle utilizing a plurality of cutting implements, generate state data and association data associated with cutting implements, detect missing cutting implements, and initiate control actions associated with missing control elements as described above, and/or any other operations or functions of the one or more computing device(s) 602.

The memory device(s) 606 can further store data 610 that can be accessed by the processors 604. For example, the data 610 can include state data, association data, processing cycle and/or stages data, and user interface data, etc., as described herein. The data 610 can include one or more table(s), function(s), algorithm(s), model(s), equation(s), etc. according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of tracking cutting implements in a processing facility, comprising:

generating, by a computing system comprising one or more computing devices, state data for each of a plurality of cutting implements to be deployed in association with the processing facility, wherein the state data is based at least in part on a first implement scan that detects a respective tracking indicium of each of the plurality of cutting implements;

generating, by the computing system, association data that associates the respective tracking indicium of each cutting implement of the plurality of cutting implements with a respective operator identifier for one of a plurality of operators to which such cutting implement is assigned, wherein the association data is based at least in part on a second implement scan of the plurality of cutting implements, wherein the association data includes data indicative of an association between the respective tracking indicium for each cutting implement of the plurality of cutting implements and a respective line identifier for one of a plurality of processing lines to which such cutting implement is assigned;

generating, by the computing system, additional state data for each of subset of the plurality of cutting implements, wherein the additional state data is based at least in part on a third implement scan that detects the respective tracking indicium of each of the subset of the plurality of cutting implements;

detecting, by the computing system, an absence of at least a portion of the additional state data associated with the respective tracking indicium of a first cutting implement of the plurality of cutting implements;

determining, by the computing system, the respective operator identifier associated with the respective tracking indicium of the first cutting implement based on the association data; and initiating, by the computing system, a control action associated with the first cutting implement based at least in part on the respective operator identifier that is associated with the respective tracking indicium of the first cutting implement wherein initiating, by the computing system, the control action comprises:

transmitting, by the computing system, one or more control messages including data indicative of the one or more of the plurality of processing lines to which such cutting implement assigned.

2. The computer-implemented method of claim 1, wherein:

the state data is based at least in part on a first cycle update associated with a processing cycle at the processing facility.

3. The computer-implemented method of claim 2, further comprising:

detecting the first cycle update based at least in part on the first implement scan.

4. The computer-implemented method of claim 3, wherein:

the additional state data includes second state data based at least in part on a second cycle update associated with the processing cycle.

5. The computer-implemented method of claim 1, further comprising:

obtaining, by the computing system, data indicative of a first container scan that detects a tracking indicium of a first container to be used for transporting the plurality of cutting implements to one or more of a plurality of processing lines; and associating, by the computing system, the respective tracking indicium for each cutting implement of the plurality of cutting implements with the tracking indicium of the first container.

6. The computer-implemented method of claim 1, further comprising:

generating, by the computing system, data indicative of a cycle count for each of the subset of the plurality of cutting implements based at least in part on the third implement scan.

7. The computer-implemented method of claim 1, wherein:

the state data for each of the plurality of cutting implements includes a respective timestamp associated with the first implement scan for such cutting implement.

8. The computer-implemented method of claim 1, further comprising:

obtaining, by a first computing device of the computing system and from one or more mobile computing devices of the computing system, data indicative of the first implement scan of the plurality of cutting implements, the data indicative of the first implement scan including the respective tracking indicium of each of the plurality of cutting implements.

9. The computer-implemented method of claim 1, wherein initiating, by the computing system, the control action comprises:

generating a graphical user interface indicating that the first cutting implement is missing.

10. A computing system, comprising:

one or more mobile computing devices associated with a processing facility, each of the one or more mobile computing device including one or more processors, a user interface, and one or more sensors configured to generate sensor data in response to physically scanning one or more of a plurality of cutting implements to be deployed at the processing, wherein the processing facility includes a plurality of processing lines; and a tracking computing system including one or more processors and one or more non-transitory computer-readable storage media, the non-transitory computer-readable storage media storing instructions that when executed by the one or more processors of the tracking computing system cause the one or more processors of the tracking computing system to perform operations, the operations comprising:

determining state data for each of a plurality of cutting implements to be deployed in association with the processing facility, wherein the state data is based at least in part on a first implement scan that detects a respective tracking indicium of each of the plurality of cutting implements;

generating association data that associates the respective tracking indicium of each cutting implement of the plurality of cutting implements with a respective operator identifier for one of a plurality of operators to which such cutting implement is assigned, wherein the association data is based at least in part on a second implement scan of the plurality of cutting implements, wherein the association data includes data indicative of an association between the respective tracking indicium for each cutting implement of the plurality of cutting implements and a respective line identifier for one of a plurality of processing lines to which such cutting implement is assigned;

generating, by the computing system, additional state data for each of subset of the plurality of cutting implements, wherein the additional state data is based at least in part on a third implement scan that detects the respective tracking indicium of each of the subset of the plurality of cutting implements, detecting, by the computing system, an absence of at least a portion of the additional state data associated with the respective tracking indicium of a first cutting implement of the plurality of cutting implements;

determining, by the computing system, the respective operator identifier associated with the respective tracking indicium of the first cutting implement based on the association data; and initiating, by the computing system, a control action associated with the first cutting implement based at least in part on the respective operator identifier that is associated with the respective tracking indicium of the first cutting implement, wherein initiating, by the computing system, the control action comprises:

transmitting, by the computing system, one or more control messages including data indicative of the one or more of the plurality of processing lines to which such cutting implement assigned.

11. The computing system of claim 10, wherein:
the state data is based at least in part on a first cycle update associated with a processing cycle at the processing facility.

12. The computing system of claim 11, wherein the operations further comprise:
detecting the first cycle update based at least in part on the first implement scan.

13. The computing system of claim 10, wherein the operations further comprise:
obtaining data indicative of a first container scan that detects a tracking indicium of a first container to be used for transporting the plurality of cutting implements to one or more of the plurality of processing lines; and
associating the respective tracking indicium for each cutting implement of the plurality of cutting implements with the tracking indicium of the first container.

14. The computing system of claim 10, wherein the operations further comprise:
generating data indicative of a cycle count for each of the subset of the plurality of cutting implements based at least in part on the third implement scan.

15. One or more non-transitory computer-readable media that store instructions that, when executed by one or more processors, cause the one or more processors to perform operations, the operations comprising:
generating state data for each of a plurality of cutting implements to be deployed in association with a processing facility, wherein the state data is based at least in part on a first implement scan that detects a respective tracking indicium of each of the plurality of cutting implements;
generating association data that associates the respective tracking indicium of each cutting implement of the plurality of cutting implements with a respective operator identifier for one of a plurality of operators to which such cutting implement is assigned, wherein the association data is based at least in part on a second implement scan of the plurality of cutting implements, wherein the association data includes data indicative of an association between the respective tracking indicium for each cutting implement of the plurality of cutting implements and a respective line identifier for one of a plurality of processing lines to which such cutting implement is assigned;
generating additional state data for each of subset of the plurality of cutting implements, wherein the additional state data is based at least in part on a third implement scan that detects the respective tracking indicium of each of the subset of the plurality of cutting implements;
detecting an absence of at least a portion of the additional state data associated with the respective tracking indicium of a first cutting implement of the plurality of cutting implements;
determining the respective operator identifier associated with the respective tracking indicium of the first cutting implement based on the association data; and
initiating a control action associated with the first cutting implement based at least in part on the respective operator identifier that is associated with the respective tracking indicium of the first cutting implement, wherein initiating the control action comprises:
transmitting one or more control messages including data indicative of the one or more of the plurality of processing lines to which such cutting implement assigned.

16. The one or more non-transitory computer-readable media of claim 15, wherein the operations further comprise:
obtaining data indicative of a first container scan that detects a tracking indicium of a first container to be used for transporting the plurality of cutting implements to one or more of a plurality of processing lines; and
associating the respective tracking indicium for each cutting implement of the plurality of cutting implements with the tracking indicium of the first container.

17. The one or more non-transitory computer-readable media of claim 15, wherein the operations further comprise:
generating data indicative of a cycle count for each of the subset of the plurality of cutting implements based at least in part on the third implement scan.

18. The one or more non-transitory computer-readable media of claim 15, wherein the operations further comprise:
obtaining from one or more mobile computing devices, data indicative of the first implement scan of the plurality of cutting implements, the data indicative of the first implement scan including the respective tracking indicium of each of the plurality of cutting implements.

* * * * *